United States Patent
Shachar et al.

(10) Patent No.: US 12,366,978 B2
(45) Date of Patent: Jul. 22, 2025

(54) MAPPING STORAGE OBJECTS TO STORAGE CONTROLLERS USING DIGITAL TWINS

(71) Applicant: Dell Products L.P., Round Rock, TX (US)

(72) Inventors: Tomer Shachar, Beer-Sheva (IL); Yevgeni Gehtman, Modi'in (IL); Ophir Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/505,272

(22) Filed: Nov. 9, 2023

(65) Prior Publication Data

US 2025/0156090 A1    May 15, 2025

(51) Int. Cl.
   *G06F 12/00*    (2006.01)
   *G06F 3/06*    (2006.01)

(52) U.S. Cl.
   CPC .......... *G06F 3/0629* (2013.01); *G06F 3/0604* (2013.01); *G06F 3/0683* (2013.01)

(58) Field of Classification Search
   CPC ...... G06F 3/061; G06F 3/0629; G06F 3/0604; G06F 3/0683; G06F 9/5083; G06F 9/505; G06F 9/4856; G06F 12/02; G06F 12/0806
   See application file for complete search history.

(56) References Cited

U.S. PATENT DOCUMENTS 11,048,554 B1    6/2021    Brennan et al.
2020/0028894 A1*    1/2020    Memon ................. G06F 3/0605

OTHER PUBLICATIONS

Gallagher, Jolie; "Automatic Load Balancing Overview"; https://docs.netapp.com/us-en/e-series-santricity/sm-settings/automatic-load-balancing-overview.html; dated May 9, 2022.
U.S. Appl. No. 17/735,737, entitled; "Virtual Volume Placement Based on Activity Level"; filed on May 3, 2022.

* cited by examiner

*Primary Examiner* — Shawn X Gu
(74) *Attorney, Agent, or Firm* — Ryan, Mason & Lewis, LLP (57) ABSTRACT

Techniques are provided for mapping storage objects to storage controllers using digital twins. One method comprises obtaining a virtual representation of a storage system that comprises storage objects and storage controllers, wherein a given storage object is mapped to a particular storage controller according to a storage object to storage controller mapping configuration; configuring the virtual representation of the storage system, for multiple iterations, based on at least one storage metric for respective storage objects, wherein each iteration corresponds to a different storage object to storage controller mapping configuration and generates a load balance score for the respective storage object to storage controller mapping configuration; selecting a given storage object to storage controller mapping configuration based on the respective load balance scores; and initiating an implementation of the selected storage object to storage controller mapping configuration in the storage system.

20 Claims, 8 Drawing Sheets

| STORAGE OBJECT IDENTIFIER | A | B | C |
|---|---|---|---|
| COMPUTE RESOURCE UTILIZATION SCORE | 20 | 50 | 30 |

550

| STORAGE OBJECT TO STORAGE CONTROLLER MAPPING CONFIGURATION | STORAGE OBJECTS ASSIGNED TO STORAGE CONTROLLER 560-1 | STORAGE OBJECTS ASSIGNED TO STORAGE CONTROLLER 560-2 | STORAGE CONTROLLER LOAD DELTA SCORE | LOAD BALANCE SCORE |
|---|---|---|---|---|
| 1 | A | B, C | 60 | 30 |
| 2 | A, B | C | 30 | 50 |
| 3 | C, A | B | 0 | 100 |
| ⋮ | ⋮ | ⋮ | ⋮ | ⋮ |

MAPPING STORAGE OBJECTS TO STORAGE CONTROLLERS USING DIGITAL TWINS

BACKGROUND

When storage objects, such as storage devices, storage volumes and/or virtual storage volumes, are deployed, they are typically assigned to a storage controller according to a storage object mapping policy. The storage controller assigned for a given storage object processes the input-output (IO) requests of the given storage object, resulting in a utilization of compute and storage resources, for example, by the assigned storage controller. The IO activity for each storage object may vary over time. Thus, the load on a given storage controller associated with such storage objects will also vary over time, impairing the resource utilization of the given storage controller.

SUMMARY

Illustrative embodiments of the disclosure provide techniques for mapping storage objects to storage controllers using digital twins. An exemplary method comprises obtaining at least one virtual representation of a storage system, wherein the storage system comprises a plurality of storage objects and a plurality of storage controllers, wherein a given storage object is mapped to a particular storage controller according to a storage object to storage controller mapping configuration; configuring the at least one virtual representation of the storage system, for a plurality of iterations, based at least in part on at least one storage metric for respective ones of the plurality of the storage objects, wherein each of the plurality of iterations corresponds to a different one of a plurality of storage object to storage controller mapping configurations and generates a load balance score for the respective storage object to storage controller mapping configuration; selecting a given one of the plurality of storage object to storage controller mapping configurations based at least in part on the respective load balance scores; and initiating an implementation of the selected storage object to storage controller mapping configuration in the storage system.

Illustrative embodiments can provide significant advantages relative to conventional storage object placement techniques. For example, problems associated with existing storage object placement techniques are overcome in one or more embodiments by configuring a virtual representation of a storage system using storage metrics for each storage object to determine a load balance score for each of a plurality of storage object to storage controller mapping configurations and selecting a given storage object to storage controller mapping configuration using the generated load balance scores.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

As noted above, when storage objects are deployed, they are typically assigned (e.g., mapped) to a particular storage controller based on various factors, such as a number of storage objects already assigned to the particular storage controller. The storage object placement often remains unchanged for the lifetime of each storage object. Optimizing the resource utilization of each storage controller is typically challenging and based on a number of factors, such as IO size, IO patterns and cache hit rate, for example. Currently, storage objects are manually moved among storage controllers in response to imbalanced compute and/or storage resource utilization of two or more storage controllers, for example, using trial and error techniques.

In one or more embodiments of the present disclosure, storage object placement techniques are provided that employ digital twins of one or more storage arrays to evaluate respective load balance scores, determined using a number of storage metrics for the storage objects, for various storage object to storage controller mapping configurations. In at least some embodiments, a resource utilization score is determined for each storage object, and a load balance score is determined for each storage object to storage controller mapping configuration based on the differences between an aggregation of the resource utilization scores assigned to each storage controller.

Figure 1:
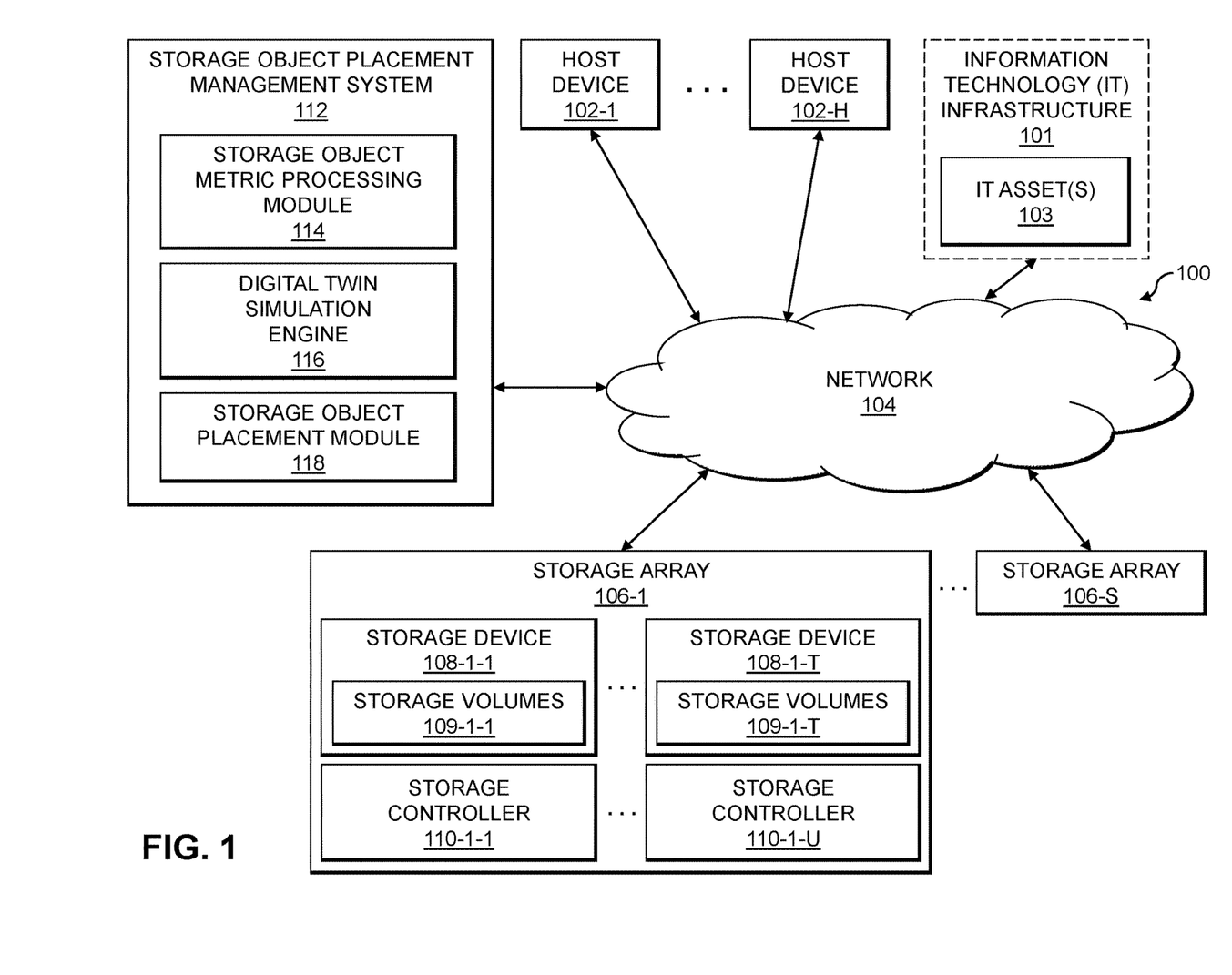
FIG. 1 is a block diagram of an information processing system configured for mapping storage objects to storage controllers using digital twins in an illustrative embodiment.

FIG. 1 is a block diagram of an information processing system 100 configured for mapping storage objects to storage controllers using digital twins in an illustrative embodiment. The information processing system 100 comprises one or more host devices 102-1, . . . 102-H (collectively, host devices 102) that communicate over a network 104 with a storage object placement management system 112.

One or more storage arrays 106-1, . . . 106-S (collectively, storage arrays 106) are also coupled to the network 104. The storage array 106-1, for example, comprises a plurality of storage devices 108-1-1, . . . 108-1-T (collectively, storage devices 108) and a plurality of storage controllers 110-1-1, . . . 110-1-U (collectively, storage controllers 110). The storage devices 108 store storage volumes 109-1-1, . . . 109-1-T (collectively, storage volumes 109). The storage volumes 109 illustratively comprise respective logical units (LUNs) or other types of logical storage volumes. The storage controllers 110 facilitate IO processing in some embodiments for the storage devices 108. The storage array 106-1 and its associated storage devices 108 are an example of what is more generally referred to herein as a "storage system." This storage system in the present embodiment is shared by the host devices 102, and is therefore an example of a shared storage system. In embodiments where there is only a single host device 102, the host device 102 may be configured to have exclusive use of the storage system.

The storage controllers 110 of the storage arrays 106 should also be understood to include additional modules and other components typically found in conventional implementations of storage controllers and storage systems, although such additional modules and other components are omitted from the figure for clarity and simplicity of illustration. For example, in some embodiments, each of the storage controllers 110 has one or more local caches or allocated portions of a global cache associated therewith, although numerous alternative arrangements are possible. The storage controllers 110 can be implemented as respective storage processors, directors or other storage system components configured to control storage system operations relating to processing of IO operations.

In some embodiments, the storage arrays 106 may represent respective storage nodes of a storage cluster that hosts virtual volumes for one or more virtual machines (VMs). The network 104, in some embodiments, may comprise a storage area network (SAN). Additional details of a virtualization environment that utilizes virtual volume storage are described below.

Each of the other storage arrays 106, such as storage array 106-S, is assumed to be configured to include storage devices 108, storage volumes 109 and storage controllers 110, in a manner similar to that illustrated for storage array 106-1 in FIG. 1.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Also coupled to the network 104 is an information technology (IT) infrastructure 101 comprising one or more IT assets 103. The IT assets 103 may comprise physical and/or virtual computing resources in the IT infrastructure 101. Physical computing resources may include physical hardware such as servers, host devices, storage systems, networking equipment, Internet of Things (IoT) devices, and other types of processing and computing devices including desktops, laptops, tablets, smartphones, etc. Virtual computing resources may include VMs, containers, etc.

The IT assets 103 of the IT infrastructure 101 may host applications that are utilized by respective one or more client devices, such as in accordance with a client-server computer program architecture. In some embodiments, the applications comprise web applications designed for delivery from assets in the IT infrastructure 101 to users (e.g., of client devices) over the network 104. Various other examples are possible, such as where one or more applications are used internal to the IT infrastructure 101 and not exposed to the client devices. It should be appreciated that, in some embodiments, some of the IT assets 103 of the IT infrastructure 101 may themselves be viewed as applications or more generally as software or hardware. For example, individual ones of the IT assets 103 that are virtual computing resources implemented as software containers may represent software. As another example, individual ones of the IT assets 103 that are physical computing resources may represent hardware devices.

The IT assets 103 in such an arrangement illustratively provide compute services such as execution of one or more applications on behalf of one or more users. Such applications illustratively generate IO operations that are processed by a corresponding one of the storage arrays 106. The term "input-output" as used herein refers to at least one of input and output. For example, IO operations may comprise write requests and/or read requests directed to logical addresses of a particular storage volume 109 of a given one of the storage arrays 106. These and other types of IO operations are also generally referred to herein as IO requests. References herein to terms such as "input-output" and "IO" should be understood to refer to input and/or output. Thus, an IO operation relates to at least one of input and output.

The term "user" herein is intended to be broadly construed so as to encompass numerous arrangements of human, hardware, software or firmware entities, as well as combinations of such entities.

It should be apparent that the term "storage system" as used herein is intended to be broadly construed and may encompass multiple distinct instances of a commercially-available storage array. Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

Also, the term "storage device" as used herein is intended to be broadly construed, so as to encompass, for example, a logical storage device such as a LUN or other logical storage volume. A logical storage device can be defined in the storage devices 108 to include different portions of one or more physical storage devices. Storage devices 108 may therefore be viewed as comprising respective LUNs or other logical storage volumes.

The term "storage object" as used herein is intended to be broadly construed, so as to encompass, for example, storage devices 108 and/or storage volumes 109 (including virtual storage volumes), as would be apparent to a person of ordinary skill in the art.

The storage object placement management system 112 includes a storage object metric processing module 114, a digital twin simulation engine 116 and a storage object placement module 118. The storage object metric processing module 114 evaluates a number of storage metrics (e.g., obtained from a storage array and/or a storage system) for the storage objects, as discussed further below in conjunction with FIG. 3. The digital twin simulation engine 116 employs digital twins to simulate one or more storage arrays and to evaluate respective load balance scores, determined using a number of the storage metrics for the storage objects, for various storage object to storage controller mapping configurations.

A digital twin typically refers to a virtual representation (e.g., a virtual copy or a digital model) of a physical or digital product, process, and/or system. A digital twin can be used to analyze the performance of a physical product, process, and/or system in order to better understand operations associated with the product, process, and/or system being virtually represented.

In one or more embodiments, digital twins are employed as virtual representations of one or more storage arrays to simulate various storage object to storage controller mapping configurations and to evaluate respective load balance scores for the simulated storage object to storage controller mapping configurations.

The storage object placement module 118, in at least some embodiments, is configured to select and place one or more storage objects with different storage controllers 110 (e.g., different ones of the storage controllers 110) based on the computed load balance scores.

At least portions of the functionality of the storage object metric processing module 114, digital twin simulation engine 116 and storage object placement module 118 may be implemented at least in part in the form of software that is stored in memory and executed by a processor.

The storage object placement management system 112 (or portions thereof) may be part of one or more storage arrays 106 and/or of one or more host devices 102. Thus, although shown as external to the host devices 102 and storage arrays 106 in the FIG. 1 embodiment, it should be appreciated that the storage object placement management system 112 in other embodiments may be implemented at least in part internal to one or more of the host devices 102 and/or one or more of the storage arrays 106 (e.g., such as on the storage controllers 110 of storage array 106-1). For example, one or more of the host devices 102 and/or storage arrays 106 may provide at least a portion of the storage object metric processing module 114 for providing storage metrics and/or performing one or more calculations that use such storage metrics, as discussed further below in conjunction with FIG. 3.

The host devices 102, storage arrays 106, and the storage object placement management system 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102, the storage arrays 106 and the storage object placement management system 112 may be implemented on respective distinct processing platforms, although numerous other arrangements are possible. For example, in some embodiments at least portions of one or more of the host devices 102, the storage arrays 106 and the storage object placement management system 112 are implemented on the same processing platform. The storage object placement management system 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1, in some embodiments, comprises a persistent memory that is implemented using a flash memory or other type of non-volatile memory of the storage array 106-1. More particular examples include NAND-based flash memory or other types of non-volatile memory such as resistive RAM, phase change memory, and spin torque transfer magneto-resistive RAM (STT-MRAM). The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the storage object placement management system 112, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. In some embodiments, the storage array 106-1 may be associated with a first storage tier and the storage array 106-S may be associated with a second, different storage tier. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As noted above, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays 106 arranged in an active-active configuration and/or an active-inactive configuration. For example, such an active-active configuration can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more VMs or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the storage object placement management system 112 may be implemented at least in part in the first geographic location, the second geographic location, and one or more other geographic locations. Thus, it is possible in some implementations of the system 100 for different ones of the host devices 102, the storage arrays 106 and the storage object placement management system 112 to reside in different data centers.

Numerous other distributed implementations of the host devices 102, the storage arrays 106 and the storage object placement management system 112 are possible. Accordingly, the host devices 102, the storage arrays 106 and the storage object placement management system 112 can also be implemented in a distributed manner across multiple data centers.

Additional examples of processing platforms utilized to implement portions of the system 100 in illustrative embodiments will be described in more detail below in conjunction with FIGS. 7 and 8.

It should be understood that the particular sets of modules and other components implemented in the system 100 as illustrated in FIG. 1 are presented by way of example only. In other embodiments, only subsets of these components, or additional or alternative sets of components, may be used, and such components may exhibit additional or alternative functionality and configurations.

It is to be appreciated that these and other features of illustrative embodiments are presented by way of example only, and should not be construed as limiting in any way.

As indicated previously, illustrative embodiments overcome various drawbacks of conventional practice by configuring the system 100 to include functionality for mapping storage objects to storage controllers using digital twins, as will be described in more detail.

In some data centers or other IT infrastructure that includes virtualized infrastructure (e.g., VDI environments including multiple VMs), SAN and NAS arrays may be virtualized. For example, a virtual volume (vVol) integration and management framework may be used to virtualize SAN and NAS arrays, enabling a more efficient operational model that, in at least some embodiments, is optimized for virtualized environments and is centered on the application instead of the infrastructure.

Generally, virtual volumes (also referred to herein as vVols) are encapsulations of VM files, virtual disks, and their derivatives. On a storage system, virtual volumes can reside in virtual volume datastores, which are also referred to as storage containers. Virtual volume datastores are a type of datastore which allows virtual volumes to map directly to a storage system at a more granular level than VM filesystem (VMFS) and Network File System (NFS) datastores. While VMFS and NFS datastores are managed and provisioned at the LUN or filesystem level, virtual volumes allow VMs or virtual disks to be managed independently. An end-user, for example, can create a virtual volume datastore based on underlying storage pools and allocate a specific portion of one or more storage pools to be used for the virtual volume datastore and its virtual volumes. A hypervisor may use NAS and SCSI Protocol Endpoints (PEs) as access points for IO communication between VMs and their virtual volume datastores on a storage system.

Accordingly, virtual volumes can be stored natively inside a storage system that is connected to one or more hosts through Ethernet or SAN. In some embodiments, the virtual volumes are exported as objects by a compliant storage system and are managed entirely by hardware on the storage side. Typically, a globally unique identifier (GUID) identifies a virtual volume. Virtual volumes are not preprovisioned, in at least some embodiments, but created automatically when VM management operations are performed. These operations can include, for example, a VM creation, cloning, and snapshotting. One or more virtual volumes can be associated with a VM.

Figure 2:
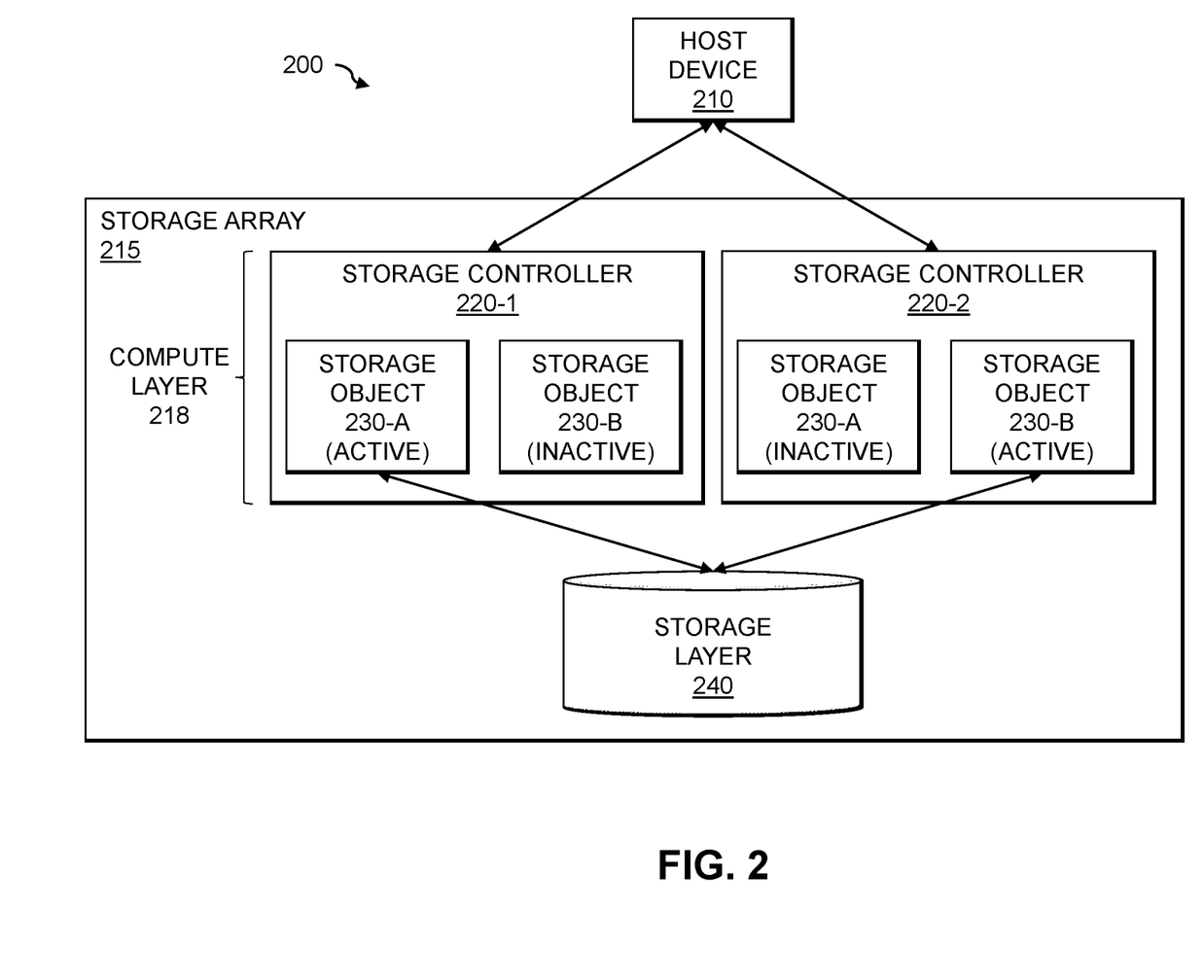
FIG. 2 illustrates an exemplary assignment of storage objects to storage controllers in an illustrative embodiment.

FIG. 2 illustrates an exemplary assignment 200 of storage objects to storage controllers in an illustrative embodiment. In the example of FIG. 2, a storage array 215 comprises two storage controllers 220-1 and 220-2 (collectively, storage controllers 220), in a compute layer 218, configured in an active/standby configuration (also referred to as an active/inactive configuration), whereby a given storage object is configured to be "active" with respect to one storage controller 220 (e.g., the one storage controller 220 has "primary" responsibility for the given storage object) and "inactive" with respect to the second storage controller 220 (e.g., the second storage controller 220 has "secondary" responsibility for the given storage object).

The current primary storage controller assigned for a given storage object processes the IO requests from a host device 210 directed to the given storage object, resulting in a utilization of compute and storage resources by the primary storage controller. Likewise, the "secondary" storage controller for a given storage object may be tasked with assuming the primary storage controller role. In at least some embodiments, a given storage object may have an active relationship with only one storage controller.

In the example of FIG. 2, storage object 230-A is assigned to storage controller 220-1 with an active relationship, and is assigned to storage controller 220-2 with an inactive relationship, under a current storage object placement. Likewise, storage object 230-B is assigned to storage controller 220-1 with an inactive relationship, and is assigned to storage controller 220-2 with an active relationship, under a current storage object placement.

The underlying storage for the storage objects 230 assigned to a primary storage controller 220 with an active relationship is in a storage layer 240 managed by the respective primary storage controller 220.

Figure 3:
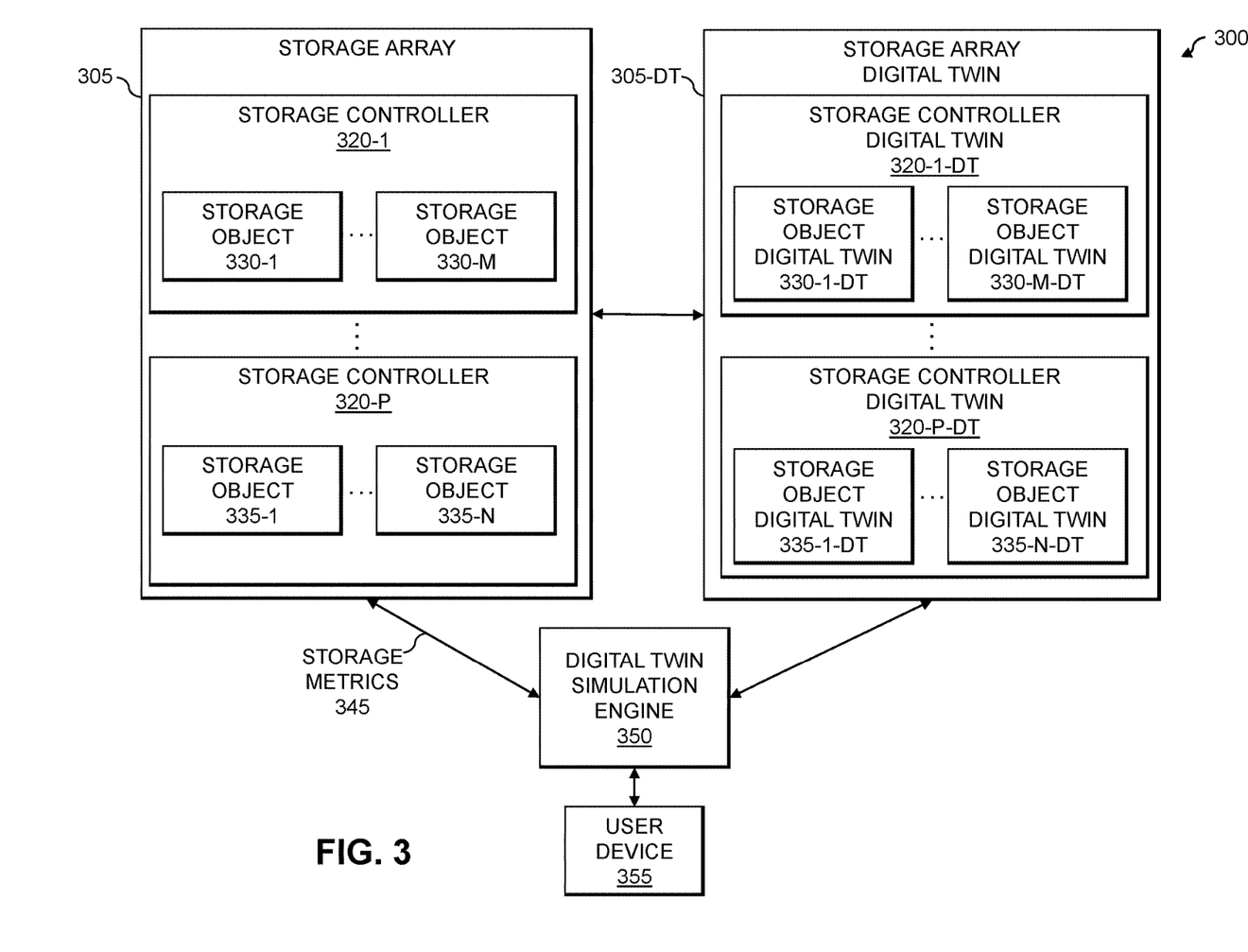
FIG. 3 illustrates a computing environment with digital twin simulation according to an illustrative embodiment.

FIG. 3 illustrates a computing environment 300 with digital twin simulation according to an illustrative embodiment. In the example of FIG. 3, a digital twin simulation engine 350 is operatively coupled to a storage array 305, itself comprising a plurality of storage controllers 320-1 through 320-P (collectively, storage controllers 320). As shown in FIG. 3, for a particular iteration of the digital twin simulation (e.g., for one storage object to storage controller mapping configuration), storage controller 320-1, for example, controls a plurality of storage objects 330-1 through 330-M (collectively, storage objects 330) and exemplary storage controller 320-P controls a plurality of storage objects 335-1 through 335-N (collectively, storage objects 335).

The digital twin simulation engine 350 is further operatively coupled to a storage array digital twin 305-DT comprising a plurality of storage controller digital twins 320-1-DT through 320-P-DT (collectively, storage controller digital twins 320-DT). The storage array digital twin 305-DT is used to simulate different volume placement scenarios (e.g., different storage object to storage controller mapping configurations) to substantially optimize a load distribution among the storage controllers 320 to reduce resource bottlenecks.

As shown in FIG. 3, the storage controller digital twin 320-1-DT, for example, simulates a control of a plurality of simulated storage object digital twins 330-1-DT through 330-M-DT (collectively, storage object digital twins 330-DT) and exemplary storage controller digital twin 320-P-DT simulates a control of a plurality of simulated storage object digital twins 335-1-DT through 335-N-DT (collectively, storage object digital twins 335-DT).

As further shown in FIG. 3, a user device 355 interacts with the digital twin simulation engine 350. User device 355 may be associated with an individual, a computing system, or some combination thereof. In one example, user device 355 comprises a system associated with an IT administrator, for example. It is to be further understood that the digital twin simulation engine 350 can be considered as an example of a controller.

In at least one implementation, the storage array 305 provides the digital twin simulation engine 350 with one or more designated storage metrics 345 for each storage object 330, 335, such as an IO count (e.g., in a designated time interval); a read/write percentage (e.g., a percentage of total IO operations being read and/or write operations); an IO randomness metric (e.g., related to a uniformity of IO operations over time, such as for sequential and/or random workloads); a deduplication ratio (e.g., how much of the data associated with IO operations will be reduced using a deduplication function); a compression ratio (e.g., how much of the data associated with IO operations will be reduced using a compression function) and/or an anticipated IO behavior (e.g., IO behavior in a designated short-term time window). For example, the read/write percentage may be used to evaluate a compute requirement of two storage objects, where a first storage object has primarily read operations while a second storage object has primarily write operations (where write operations typically have higher compute requirements). A higher deduplication ratio may correlate in some embodiments, with a lower compute resource requirement, while a higher compression ratio may correlate with a higher compute resource requirement. If an anticipated IO behavior of a given storage object indicates a higher expected amount of read requests for a particular time period, it may be prudent to move some storage objects assigned to the same storage controller as the given storage object to a different storage controller, to improve the resource availability of the same storage controller.

As the digital twin simulation engine 350 incorporates the storage metrics 345, the digital twin simulation engine 350 reflects the updated storage array and can be used to simulate multiple storage object to storage controller mapping configurations (for example, in multiple iterations) in the storage array digital twin 305-DT.

Figure 4:
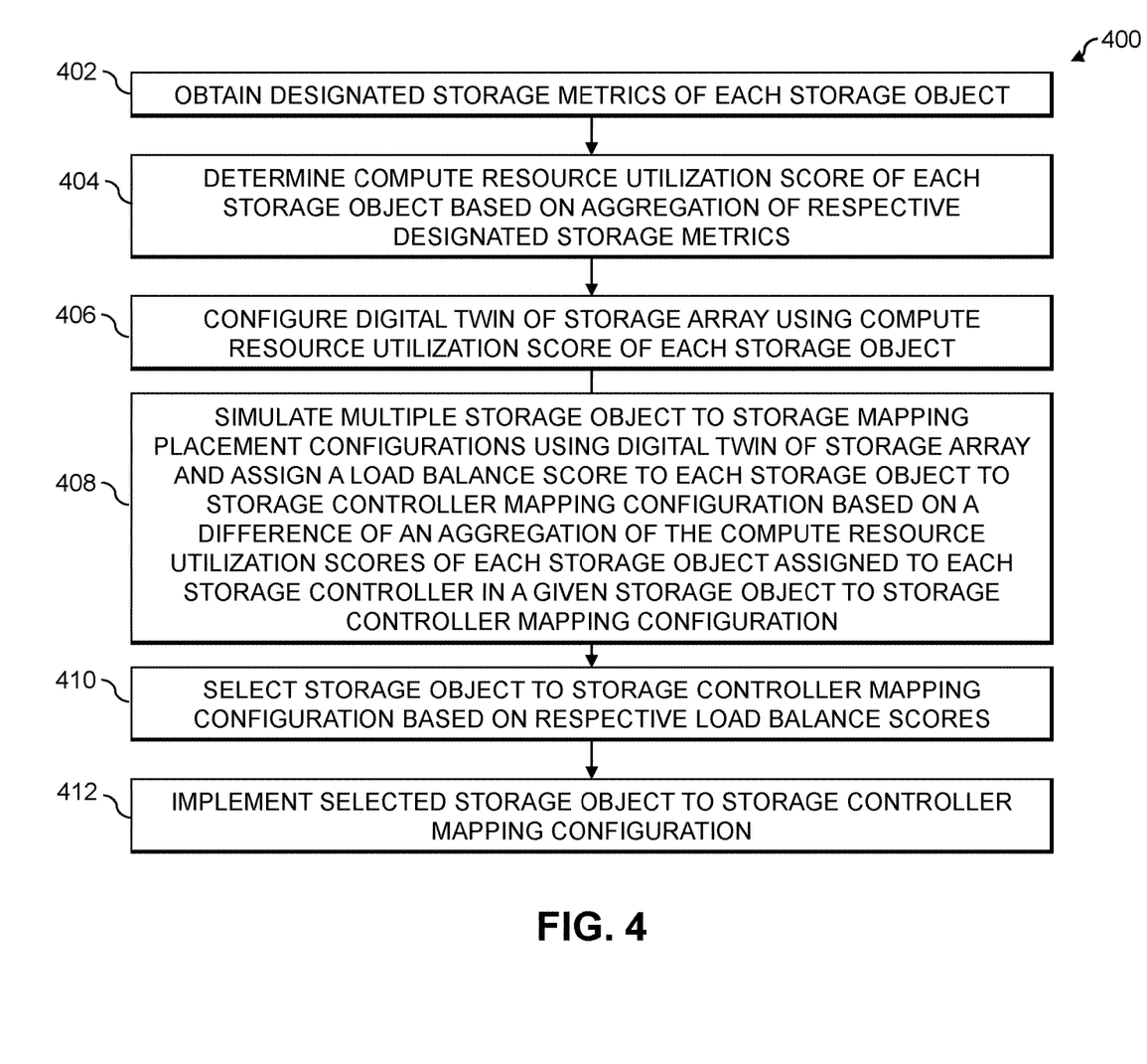
FIG. 4 is a flow diagram illustrating an exemplary implementation of a process for storage object placement using digital twins in an illustrative embodiment.

In some embodiments, the storage array 305 may provide the digital twin simulation engine 350 with an aggregation of the designated storage metrics 345 for each storage object 330, 335 (for example, expressed as a compute resource utilization score in the example of FIG. 4) in addition to, or instead of, the designated storage metrics 345.

The digital twin simulation engine 350 uses the storage metrics 345 to generate the storage array digital twin 305-DT (or portions thereof). In this manner, the digital twin simulation engine 350 knows, for each storage object 330, 335 the corresponding storage metrics 345. The storage metrics 345 for a given storage object 330, 335 may be aggregated to provide an indication of the compute resources, for example, of the storage controller that will be consumed by processing the IO requests associated with the given storage object.

In one or more embodiments, the disclosed storage object placement techniques employ the storage array digital twin 305-DT (or portions thereof) of one or more storage arrays 305 to evaluate respective load balance scores, determined using the respective storage metrics 345 for the storage objects 330, 335, for various storage object to storage controller mapping configurations. In at least some embodiments, a resource utilization score is determined for each storage object 330, 335, and a load balance score is determined for each storage object to storage controller mapping configuration based on the differences between an aggregation of the resource utilization scores assigned to each storage controller 320.

It is to be appreciated that, in one or more embodiments, the digital twin simulation engine 350 is configured to generate one or more storage controller digital twins 320-DT or otherwise obtain one or more storage controller digital twins 320-DT. In one or more illustrative embodiments, one or more storage controller digital twins 320-DT can be configured using one or more physics-based models, one or more AI-driven models, one or more simulations, one or more analytics, and one or more predictions based on the particular storage controller 320 being virtually represented. Thus, real-time data (e.g., current values of the storage metrics 345 for the particular storage controller 320 being virtually represented) and/or historical data (e.g., historical values of the storage metrics 345 for the particular storage controller 320 being virtually represented) can be data collected from a given storage controller 320 and/or some other data source. For example, one or more of the models may characterize the IO randomness metric and/or the anticipated IO behavior storage metrics 345.

In one or more illustrative embodiments, by way of example only, assume that a given storage controller digital twin 320-DT is needed/desired for on-demand simulations. That is, when user device 355 wishes to simulate storage object placement changes to a given storage controller 320, user device 355 can request digital twin simulation engine 350 to create/construct (e.g., spin up or instantiate) a digital twin of the given storage controller 320 using one or more corresponding images (e.g., snapshots or the like) from a device image datastore (not expressly shown) augmented with real-time data associated with the given storage controller 320. In some illustrative embodiments, digital twin simulation engine 350 instantiates one or more virtual machines or VMs (e.g., using vSphere, Kernel-based Virtual Machines or KVM, etc.) or one or more containers (e.g., using a Kubernetes container orchestration platform, etc.) to implement the given storage controller digital twin 320-DT. Digital twin simulation engine 350 matches the specifications of the given storage controller digital twin 320-DT and loads the one or more corresponding images to create a virtual representation (storage controller digital twin 320-DT) for a specific fidelity (resolution) of the given storage controller 320. Depending on the use case and data availability, one or multiple digital twin fidelities can be selected by user device 355, e.g., high resolution and low resolution. For example, a high-resolution digital twin may necessitate the availability of a large amount and rich infrastructure data with minimal need to involve human technicians, while a low-resolution digital twin may necessitate more human involvement due to less availability of infrastructure data. User device 355 can then use the constructed storage controller digital twin 320-DT to test and/or simulate changes to the given storage controller 320.

FIG. 4 is a flow diagram illustrating an exemplary implementation of a process 400 for storage object placement using digital twins in an illustrative embodiment. In the example of FIG. 4, the process 400 obtains the designated storage metrics (e.g., designated storage metrics 345) of each storage object in step 402. A compute resource utilization score of each storage object is determined in step 404 based at least in part on an aggregation of the respective designated storage metrics. For example, the compute resource utilization score may aggregate at least a subset of the following exemplary storage metrics in some embodiments: IO count, read/write percentage, IO randomness, deduplication ratio, compression ratio and/or anticipated IO behavior.

In step 406, the process 400 configures the digital twin of the storage array (e.g., the storage array digital twin 305-DT of FIG. 3) using the compute resource utilization score of each storage object. In other embodiments, the process 400 configure the digital twin of the storage array using the individual designated storage metrics 345 for computation of the compute resource utilization score of each storage object by the digital twin of the storage array.

Figure 5:
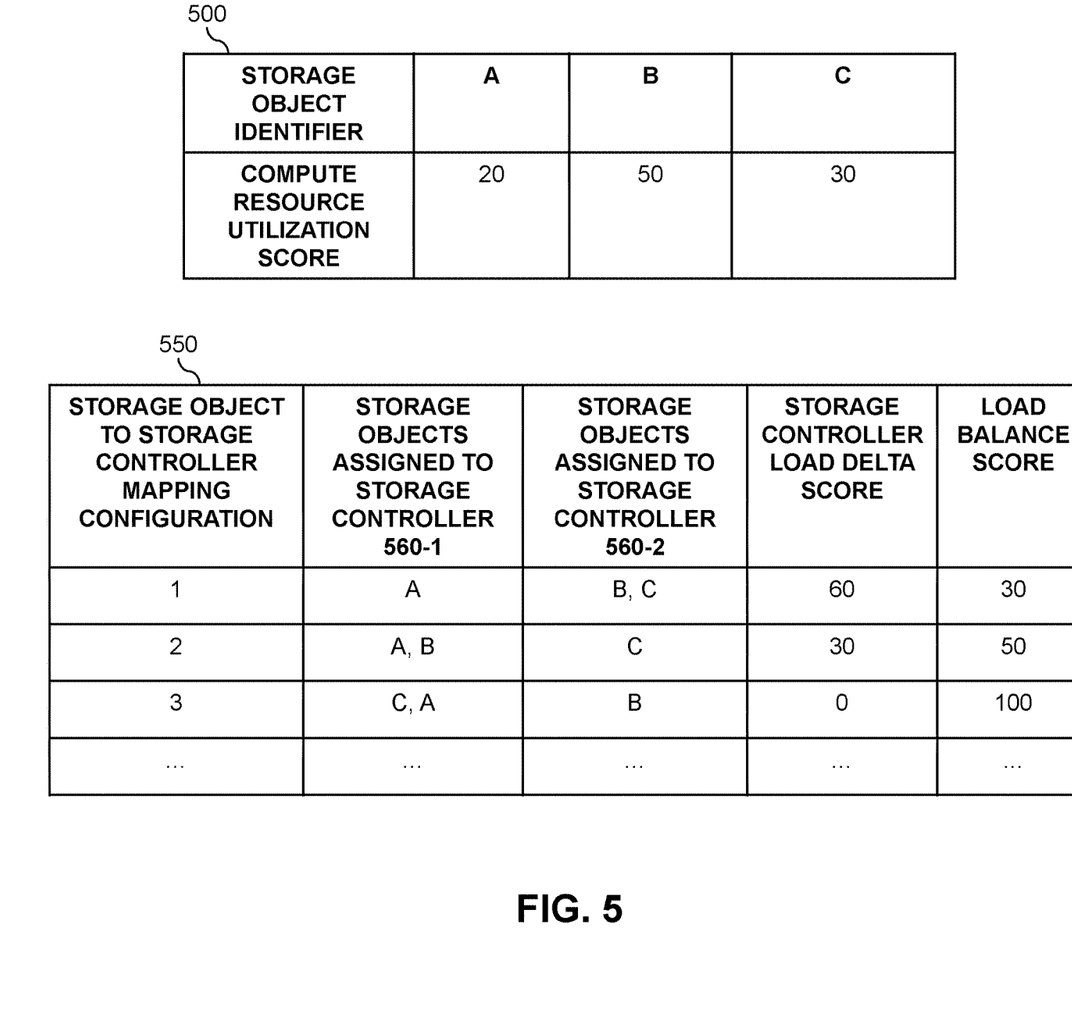
FIG. 5 shows examples of tables illustrating an exemplary storage object placement in an illustrative embodiment.

The process 400, in step 408, simulates multiple storage object to storage controller mapping configurations (for example, in multiple iterations) using the digital twin of the storage array and assigns a load balance score to each storage object to storage controller mapping configuration based on a difference of an aggregation of the compute resource utilization scores of each storage object assigned to each storage controller in a given storage object to storage controller mapping configuration, as discussed further below in conjunction with FIG. 5. In some embodiments, the load balance score represents a degree of balance of the load among the available storage controllers (e.g., based on differences of the aggregate compute load of the storage objects assigned to each respective storage controller).

In step 410, a storage object to storage controller mapping configuration is selected based on the respective load balance scores of each storage object to storage controller mapping configuration.

The process 400 optionally implements the selected storage object to storage controller mapping configuration in step 412.

In this manner, the exemplary process 400 performs an iteration for each storage object to storage controller mapping configuration to dynamically evaluate the respective load balance scores of each storage object to storage controller mapping configuration. For each iteration, a different storage object to storage controller mapping configuration (e.g., a different combination of storage objects is assigned to each storage controller for each iteration) is evaluated to obtain a corresponding load balance score.

While the process 400 of FIG. 4 is illustrated with respect to compute resources, the process 400 can be extended to additionally, or alternatively, process other resources, such as storage resources, as would be apparent to a person of ordinary skill in the art.

FIG. 5 shows examples of tables 500 and 550 illustrating an exemplary storage object placement in an illustrative embodiment. In the example of FIG. 5, it is assumed that a storage array comprises two exemplary storage controllers 560-1 and 560-2.

For each storage object, table 500 indicates a storage object identifier (e.g., corresponding to storage object A, storage object B and storage object C) and a corresponding compute resource utilization score. As noted above, in at least some embodiments, the compute resource utilization score for each storage object is based at least in part on an aggregation of the respective designated storage metrics. For example, the compute resource utilization score may aggregate at least a subset of the following exemplary storage metrics in some embodiments: IO count, read/write percentage, IO randomness, deduplication ratio, compression ratio and/or anticipated IO behavior.

In the table 500, storage object A has an exemplary compute resource utilization score of 20, storage object B has an exemplary compute resource utilization score of 50 and storage object C has an exemplary compute resource utilization score of 30.

For each storage object to storage controller mapping configuration (e.g., configuration 1 through 3), table 550 indicates the storage objects (e.g., of storage objects A, B and C) assigned (e.g., mapped) to storage controller 560-1, the storage objects assigned to storage controller 560-2, a storage controller load delta score and a load balance score.

Generally, in at least some embodiments, the storage controller load delta score for a given storage object to storage controller mapping configuration is obtained by aggregating the compute resource utilization score of each storage object assigned to the given storage controller 560-1, 560-2 and then taking a difference of the storage controller load delta score for each storage object to storage controller mapping configuration.

The load balance score, in at least some embodiments, is determined for each storage object to storage controller mapping configuration based on the respective storage controller load delta score for a given storage object to storage controller mapping configuration. For example, the load balance score for a given storage object to storage controller mapping configuration may have an inverse relationship with the respective storage controller load delta score for a given storage object to storage controller mapping configuration.

In some embodiments, the load balance score for a given storage object to storage controller mapping configuration may be determined using a standard deviation (e.g., a difference that measures how dispersed the data is in relation to a mean value) of the aggregated compute resource utilization scores, for example, of the storage objects assigned to respective storage controllers in the given storage object to storage controller mapping configuration. Generally, a standard deviation value for a given storage object to storage controller mapping configuration closer to a value of zero provides a better storage object placement.

In the example of FIG. 5, for storage object to storage controller mapping configuration 1, storage object A is assigned to storage controller 560-1 and storage objects B and C are assigned to storage controller 560-2. The corresponding storage controller load delta score is 60 (e.g., the difference between the sum (20) of the compute resource utilization scores of the storage objects assigned to storage controller 560-1 and the sum (80) of the compute resource utilization scores of the storage objects assigned to storage controller 560-2), and the corresponding load balance score is 30.

For storage object to storage controller mapping configuration 2, storage objects A and B are assigned to storage controller 560-1 and storage object C is assigned to storage controller 560-2. The corresponding storage controller load delta score is 30 (e.g., the difference between the sum (70) of the compute resource utilization scores of the storage objects assigned to storage controller 560-1 and the sum (40) of the compute resource utilization scores of the storage objects assigned to storage controller 560-2), and the corresponding load balance score is 50.

For storage object to storage controller mapping configuration 3, storage objects C and A are assigned to storage controller 560-1 and storage object B is assigned to storage controller 560-2. The corresponding storage controller load delta score is 0 (e.g., the difference between the sum (50) of the compute resource utilization scores of the storage objects assigned to storage controller 560-1 and the sum (50) of the compute resource utilization scores of the storage objects assigned to storage controller 560-2), and the corresponding load balance score is 100. Thus, storage object to storage controller mapping configuration 3 may be selected over the storage object to storage controller mapping configurations 1 and 2.

While the example of FIG. 5 is illustrated using three storage objects (A, B, C) and two storage controllers 560-1 and 560-2, the example of FIG. 5 can be extended for a storage array having additional storage objects and/or storage controllers, as would be apparent to a person of ordinary skill in the art.

Figure 6:
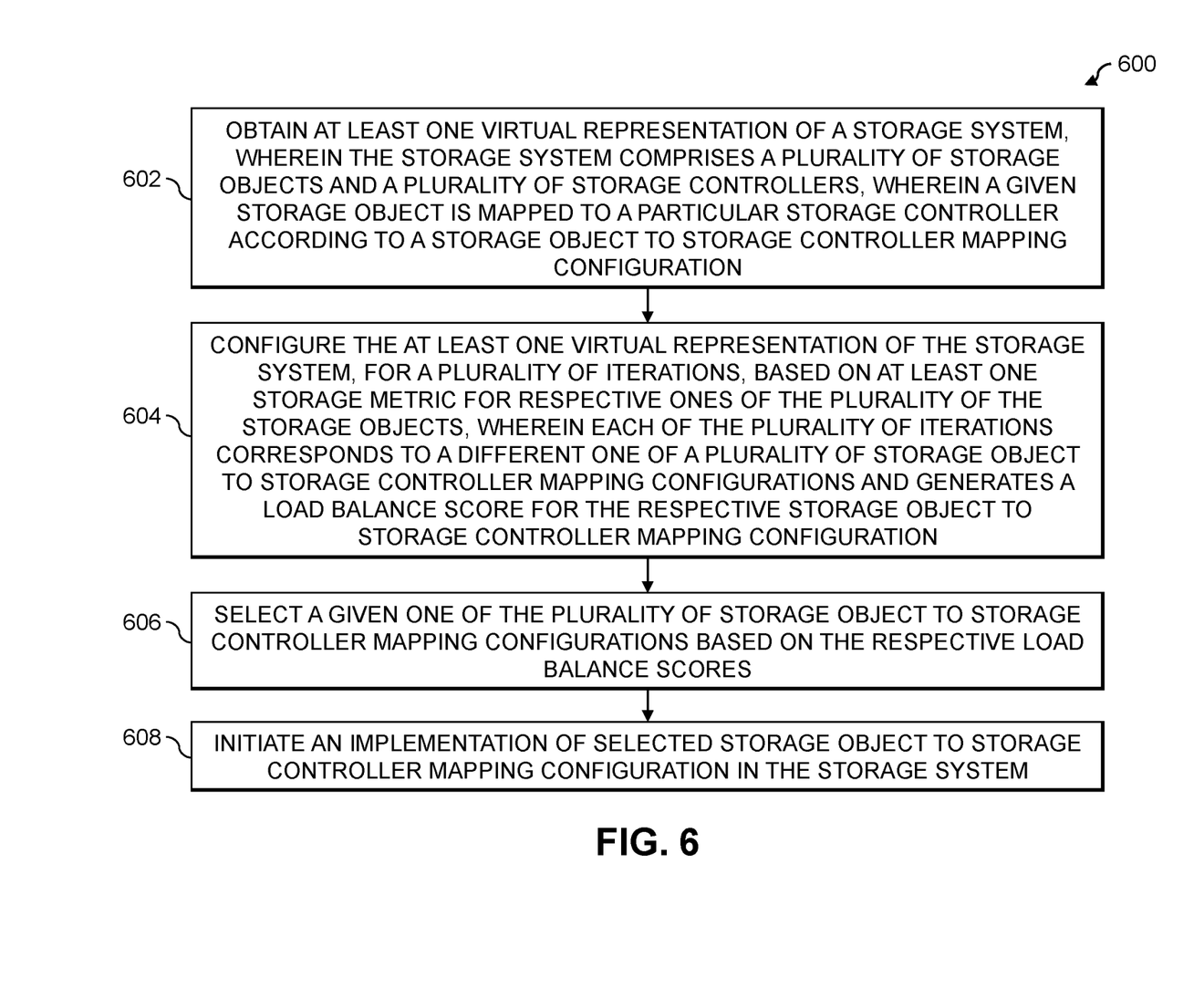
FIG. 6 is a flow diagram illustrating an exemplary implementation of a process for mapping storage objects to storage controllers using digital twins in an illustrative embodiment.

FIG. 6 is a flow diagram illustrating an exemplary implementation of a process 600 for mapping storage objects to storage controllers using digital twins in an illustrative embodiment. In the example of FIG. 6, at least one virtual representation of a storage system is obtained in step 602, wherein the storage system comprises a plurality of storage objects and a plurality of storage controllers, wherein a given storage object is mapped to a particular storage controller according to a storage object to storage controller mapping configuration.

In step 604, the at least one virtual representation of the storage system is configured, for a plurality of iterations, based on at least one storage metric for respective ones of the plurality of the storage objects, wherein each of the plurality of iterations corresponds to a different one of a plurality of storage object to storage controller mapping configurations and generates a load balance score for the respective storage object to storage controller mapping configuration.

A given one of the plurality of storage object to storage controller mapping configurations is selected in step 606 based on the respective load balance scores. An implementation of the selected storage object to storage controller mapping configuration in the storage system is initiated in step 608.

In some embodiments, the at least one storage metric for a given storage object comprises one or more of a plurality of designated storage metrics (e.g., an IO count; a read/write percentage; an IO randomness metric; a deduplication ratio; a compression ratio and/or an anticipated IO behavior) and a first aggregation (e.g., a sum) of the plurality of designated storage metrics. The first aggregation of the plurality of designated storage metrics for the given storage object may comprise at least one resource utilization score for the given storage object. The load balance score for a particular storage object to storage controller mapping configuration may be based on a difference (e.g., a standard deviation) of a second aggregation (e.g., a sum) of the resource utilization scores of the storage objects assigned to respective storage controllers in the particular storage object to storage controller mapping configuration (for example, as discussed above in conjunction with FIG. 5). The at least one storage metric for a given storage object may comprise a set of input-output metrics for the given storage object.

In one or more embodiments, the at least one virtual representation of the storage system comprises a virtual representation of at least one storage array of the storage system, a virtual representation of at least one storage controller of the storage system, and a virtual representation of at least one storage object of the storage system. The initiating the implementation of the selected storage object to storage controller mapping configuration may comprise generating one or more recommendations and/or notifications to implement the selected storage object to storage controller mapping configuration (e.g., automatically implementing the selected storage object to storage controller mapping configuration).

The particular processing operations and other network functionality described in conjunction with FIGS. 4 and 6, for example, are presented by way of illustrative example only, and should not be construed as limiting the scope of the disclosure in any way. Alternative embodiments can use other types of processing operations to provide functionality for mapping storage objects to storage controllers using digital twins. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed storage object placement techniques improve the efficiency and reliability of a storage system by dynamically updating a storage object placement based on the current designated storage metrics. In this manner, a current storage object placement may be adapted to the current environment of a given storage system. It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for mapping storage objects to storage controllers using digital twins will now be described in greater detail with reference to FIGS. 7 and 8. Although described in the context of information processing system 100, these platforms may also be used to implement at least portions of other information processing systems in other embodiments.

Figure 7:
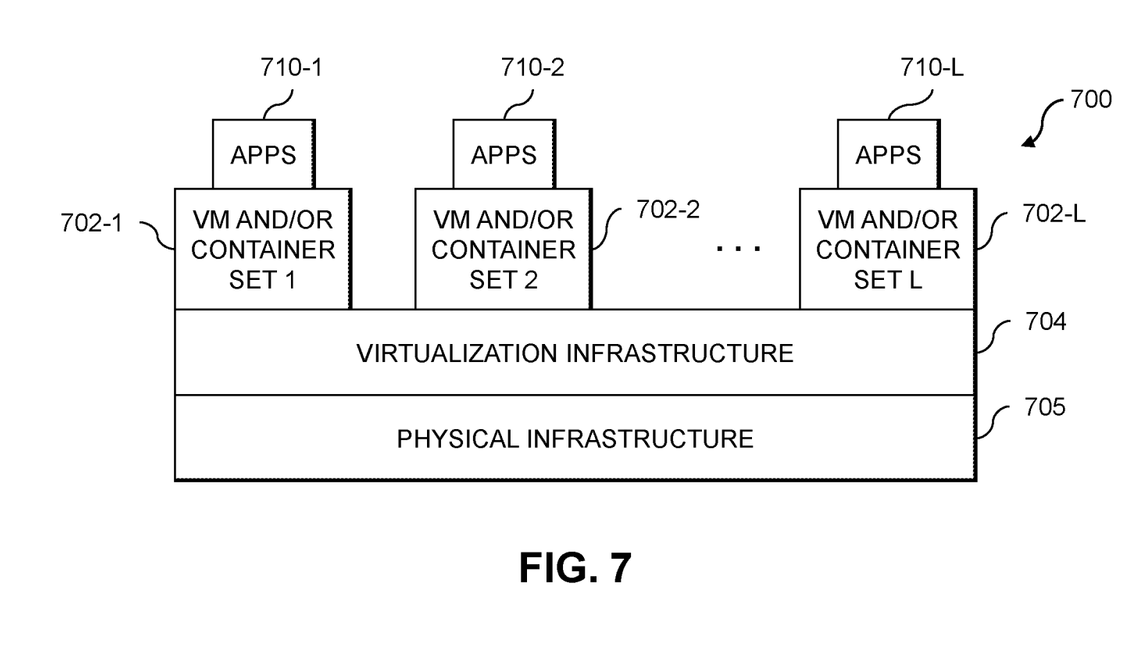
FIGS. 7 and 8 show examples of processing platforms that may be utilized to implement at least a portion of an information processing system in illustrative embodiments.
Figure 8:
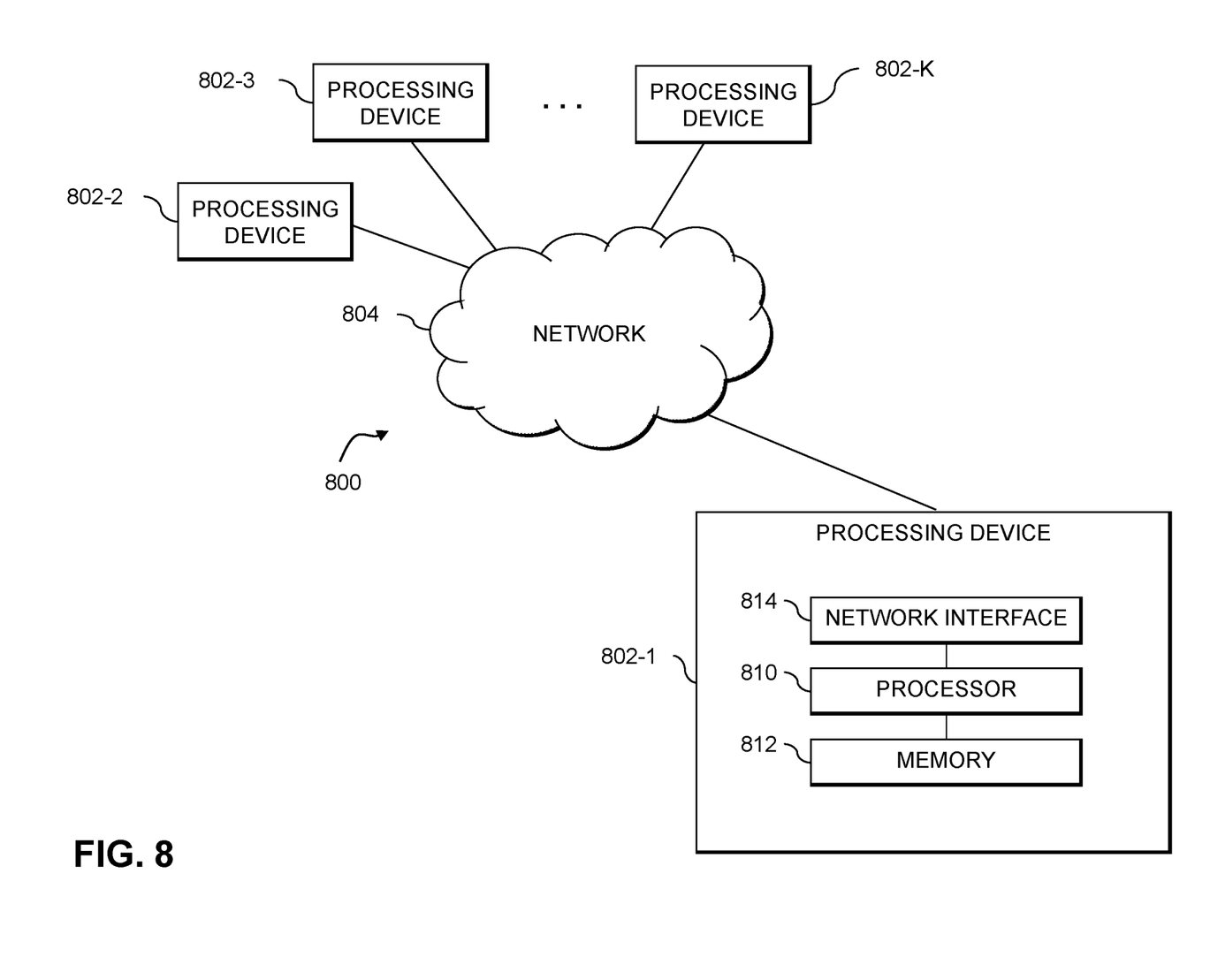

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple VMs and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of information processing system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system 800 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for mapping storage objects to storage controllers using digital twins as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining at least one virtual representation of a storage system, wherein the storage system comprises a plurality of storage objects and a plurality of storage controllers, wherein a given storage object is mapped to a particular storage controller according to a storage object to storage controller mapping configuration;
   configuring the at least one virtual representation of the storage system, for a plurality of iterations, based at least in part on at least one storage metric for respective ones of the plurality of the storage objects, wherein each of the plurality of iterations corresponds to a different one of a plurality of storage object to storage controller mapping configurations and generates a load balance score for the respective storage object to storage controller mapping configuration;
   selecting a given one of the plurality of storage object to storage controller mapping configurations based at least in part on the respective load balance scores; and
   initiating an implementation of the selected storage object to storage controller mapping configuration in the storage system;
   wherein the method is performed by at least one processing device comprising a processor coupled to a memory.

2. The method of claim 1, wherein the at least one storage metric for the given storage object comprises one or more of a plurality of designated storage metrics and a first aggregation of the plurality of designated storage metrics.

3. The method of claim 2, wherein the first aggregation of the plurality of designated storage metrics for the given storage object comprises at least one resource utilization score for the given storage object.

4. The method of claim 3, wherein the load balance score for a particular storage object to storage controller mapping configuration is based at least in part on a difference of a second aggregation of the resource utilization scores of the storage objects assigned to respective storage controllers in the particular storage object to storage controller mapping configuration.

5. The method of claim 1, wherein the at least one virtual representation of the storage system comprises a virtual representation of at least one storage array of the storage system, a virtual representation of at least one storage controller of the storage system, and a virtual representation of at least one storage object of the storage system.

6. The method of claim 1, wherein the at least one virtual representation comprises at least one digital twin.

7. The method of claim 1, wherein the at least one storage metric for the given storage object comprises a set of input-output metrics for the given storage object.

8. The method of claim 1, wherein the initiating the implementation of the selected storage object to storage controller mapping configuration comprises generating one or more of at least one recommendation and at least one notification to implement the selected storage object to storage controller mapping configuration.

9. The method of claim 1, wherein the initiating the implementation of the selected storage object to storage controller mapping configuration comprises automatically implementing the selected storage object to storage controller mapping configuration.

10. An apparatus comprising:
at least one processing device comprising a processor coupled to a memory;
the at least one processing device being configured to implement the following steps:
obtaining at least one virtual representation of a storage system, wherein the storage system comprises a plurality of storage objects and a plurality of storage controllers, wherein a given storage object is mapped to a particular storage controller according to a storage object to storage controller mapping configuration;
configuring the at least one virtual representation of the storage system, for a plurality of iterations, based at least in part on at least one storage metric for respective ones of the plurality of the storage objects, wherein each of the plurality of iterations corresponds to a different one of a plurality of storage object to storage controller mapping configurations and generates a load balance score for the respective storage object to storage controller mapping configuration;
selecting a given one of the plurality of storage object to storage controller mapping configurations based at least in part on the respective load balance scores; and
initiating an implementation of the selected storage object to storage controller mapping configuration in the storage system.

11. The apparatus of claim 10, wherein the at least one storage metric for the given storage object comprises one or more of a plurality of designated storage metrics and a first aggregation of the plurality of designated storage metrics.

12. The apparatus of claim 11, wherein the first aggregation of the plurality of designated storage metrics for the given storage object comprises at least one resource utilization score for the given storage object.

13. The apparatus of claim 12, wherein the load balance score for a particular storage object to storage controller mapping configuration is based at least in part on a difference of a second aggregation of the resource utilization scores of the storage objects assigned to respective storage controllers in the particular storage object to storage controller mapping configuration.

14. The apparatus of claim 10, wherein the at least one virtual representation of the storage system comprises a virtual representation of at least one storage array of the storage system, a virtual representation of at least one storage controller of the storage system, and a virtual representation of at least one storage object of the storage system.

15. The apparatus of claim 10, wherein the initiating the implementation of the selected storage object to storage controller mapping configuration comprises one or more of: (i) generating one or more of at least one recommendation and at least one notification to implement the selected storage object to storage controller mapping configuration and (ii) automatically implementing the selected storage object to storage controller mapping configuration.

16. A non-transitory processor-readable storage medium having stored therein program code of one or more software programs, wherein the program code when executed by at least one processing device causes the at least one processing device to perform the following steps:
obtaining at least one virtual representation of a storage system, wherein the storage system comprises a plurality of storage objects and a plurality of storage controllers, wherein a given storage object is mapped to a particular storage controller according to a storage object to storage controller mapping configuration;
configuring the at least one virtual representation of the storage system, for a plurality of iterations, based at least in part on at least one storage metric for respective ones of the plurality of the storage objects, wherein each of the plurality of iterations corresponds to a different one of a plurality of storage object to storage controller mapping configurations and generates a load balance score for the respective storage object to storage controller mapping configuration;
selecting a given one of the plurality of storage object to storage controller mapping configurations based at least in part on the respective load balance scores; and
initiating an implementation of the selected storage object to storage controller mapping configuration in the storage system.

17. The non-transitory processor-readable storage medium of claim 16, wherein the at least one storage metric for the given storage object comprises one or more of a plurality of designated storage metrics and a first aggregation of the plurality of designated storage metrics.

18. The non-transitory processor-readable storage medium of claim 17, wherein the first aggregation of the plurality of designated storage metrics for the given storage object comprises at least one resource utilization score for the given storage object.

19. The non-transitory processor-readable storage medium of claim 18, wherein the load balance score for a particular storage object to storage controller mapping configuration is based at least in part on a difference of a second aggregation of the resource utilization scores of the storage objects assigned to respective storage controllers in the particular storage object to storage controller mapping configuration.

20. The non-transitory processor-readable storage medium of claim 16, wherein the initiating the implementation of the selected storage object to storage controller mapping configuration comprises one or more of: (i) generating one or more of at least one recommendation and at least one notification to implement the selected storage object to storage controller mapping configuration and (ii) automatically implementing the selected storage object to storage controller mapping configuration.

* * * * *